United States Patent
Shieh et al.

(10) Patent No.: US 6,894,831 B2
(45) Date of Patent: *May 17, 2005

(54) PUMP ASSEMBLY EMPLOYING COUPLED RADIATION SOURCES FOR MULTIPLE FIBERS

(75) Inventors: William Shieh, Columbia, MD (US); Vladimir Petricevic, Columbia, MD (US); Thomas Clark, Columbia, MD (US)

(73) Assignee: Dorsal Networks, Inc., Columbia, MD (US)

( * ) Notice: Subject to any disclaimer, the term of this patent is extended or adjusted under 35 U.S.C. 154(b) by 57 days.

This patent is subject to a terminal disclaimer.

(21) Appl. No.: 10/650,947

(22) Filed: Aug. 29, 2003

(65) Prior Publication Data

US 2004/0042064 A1 Mar. 4, 2004

Related U.S. Application Data

(63) Continuation of application No. 09/838,218, filed on Apr. 20, 2001, now Pat. No. 6,618,195.

(51) Int. Cl.[7] .............................................. H01S 3/00
(52) U.S. Cl. .............................. 359/341.32; 359/341.33
(58) Field of Search ............................ 359/334, 341.33, 359/341.32; 372/38.06

(56) References Cited

U.S. PATENT DOCUMENTS

| | | | |
|---|---|---|---|
| 3,705,992 A | 12/1972 | Ippen et al. | |
| 4,401,364 A | 8/1983 | Mochizuki | |
| 4,616,898 A | 10/1986 | Hicks, Jr. | |
| 4,805,977 A | 2/1989 | Tamura et al. | |
| 5,173,957 A | 12/1992 | Bergano et al. | |
| 5,241,414 A | * 8/1993 | Giles et al. ............ | 359/341.33 |
| 5,502,783 A | * 3/1996 | Wu .............................. | 385/42 |
| 5,764,405 A | 6/1998 | Alphonsus | |
| 5,841,797 A | 11/1998 | Ventrudo et al. | |
| 5,914,799 A | * 6/1999 | Tan .............................. | 398/92 |
| 5,920,423 A | 7/1999 | Grubb et al. | |
| 5,936,763 A | 8/1999 | Mitsuda et al. | |
| 5,991,069 A | 11/1999 | Jander | |
| 6,008,934 A | 12/1999 | Fatehi et al. | |
| 6,049,645 A | 4/2000 | Pan et al. | |

(Continued)

OTHER PUBLICATIONS

Chraplyvy, Andrew. Limitations on Lightwave Communications Imposed by Optical–Fiber Nonlinearities. Journal of Lightwave Technology. vol. 8, No. 10, Oct. 1990.*

Emori et al., "100nm Bandwidth Flat–Gain Raman Amplifiers Pumped and Gain–Equalised by 12–Wavelength–Channel WDM Laser Diode Unit", Electronics Letters, 1999, pp. 1–2, vol. 35, No. 16.

Runge et al., "AT&T Optical Amplifier Systems", pp. 72–77.

Bubel et al., "Reliability for the SL2000 Optical Amplifier Systems", Conferences Affichees, pp. 161–165.

(Continued)

*Primary Examiner*—Thomas H. Tarcza
*Assistant Examiner*—Deandra M. Hughes (57) ABSTRACT

A method of amplifying optical signals comprising providing a plurality of input radiation signals into the inputs of a P×V coupler, each of the input radiation signals having a respective input radiation profile having a set of pump wavelengths and pump powers corresponding to the respective wavelengths, wherein at least one set is different from at least one other set; providing V output pump radiation profiles from the outputs of the P×V coupler; and amplifying an optical data signal by coupling at least one of the V output pump radiation profiles with the optical data signal, wherein at least one of the V output pump radiation profiles has a different power than at least one other of the V output pump radiation profiles.

16 Claims, 11 Drawing Sheets

U.S. PATENT DOCUMENTS

| | | | |
|---|---|---|---|
| 6,052,219 | A | 4/2000 | Kidorf et al. |
| 6,052,393 | A | 4/2000 | Islam |
| 6,052,394 | A | 4/2000 | Lee et al. |
| 6,091,538 | A | 7/2000 | Takeda et al. |
| 6,122,298 | A | 9/2000 | Kerfoot, III et al. |
| 6,134,032 | A | 10/2000 | Kram et al. |
| 6,134,033 | A | 10/2000 | Bergano et al. |
| 6,137,604 | A | 10/2000 | Bergano |
| 6,141,468 | A | 10/2000 | Kidorf et al. |
| 6,147,794 | A | 11/2000 | Stentz |
| 6,147,796 | A | 11/2000 | Ma et al. |
| 6,151,160 | A | 11/2000 | Ma et al. |
| 6,181,464 | B1 | 1/2001 | Kidorf et al. |
| 6,185,024 | B1 | 2/2001 | Johnson et al. |
| 6,211,985 | B1 | 4/2001 | Anderson |
| 6,212,310 | B1 | 4/2001 | Waarts et al. |
| 6,236,777 | B1 | 5/2001 | Ravasio et al. |
| 6,259,842 | B1 | 7/2001 | Giltner |
| 6,292,288 | B1 * | 9/2001 | Akasaka et al. ............ 359/334 |
| 6,320,695 | B1 | 11/2001 | Tanaka et al. |
| 6,320,884 | B1 | 11/2001 | Kerfoot, III et al. |
| 6,381,065 | B1 | 4/2002 | Homsey |
| 6,388,806 | B1 | 5/2002 | Freeman et al. |
| 6,433,921 | B1 | 8/2002 | Wu et al. |
| 6,452,720 | B1 | 9/2002 | Naganuma et al. |
| 6,534,712 | B1 | 3/2003 | Pitrone et al. |
| 6,606,188 | B2 * | 8/2003 | Shimojoh ................... 359/334 |
| 6,618,195 | B2 * | 9/2003 | Shieh et al. ........... 359/341.33 |
| 2001/0021062 | A1 * | 9/2001 | Probster ............... 359/341.33 |
| 2001/0050805 | A1 | 12/2001 | Ohshima et al. |
| 2002/0110328 | A1 | 8/2002 | Bischel et al. |
| 2002/0149838 | A1 | 10/2002 | Wang et al. |
| 2002/0159138 | A1 * | 10/2002 | Zou ...................... 359/341.32 |

OTHER PUBLICATIONS

Ibsen et al., "8– and 16–Channel All–Fiber DFB laser WDM Transmitters with Integrated Pump Redundancy", Photonics Technology Letters, 1999, pp. 1114–1116, vol. 11, No. 9, IEEE.

Judy et al., "Fiber Effective Area and Raman–Pumped 40 Gb/s Transmission Systems", Lucent Technologies 2000, pp. 143–145.

Namiki et al., "Recent Advances in Ultra–Wideband Raman Amplifiers", Photonics Technol. Letter, 2000 pp. FF1–1–FF1–4.

Kidorf et al., "Pump Interactions in a 100–nm Bandwidth Raman Amplifier", Photonics Technology Letters, 1999, pp. 530–532, vol. 11, No. 5, IEEE.

Bergano, "Undersea Amplified Lightwave Systems Design", Chapter 10 of Optical Fiber, Telecommunications 1997, pp. 302–335, vol. IIIA, Lucent Technologies.

Emori et al., "Demonstration of Broadband Raman Amplifiers: A Promising Application of High–Power Pumping Unit", Furukawa Review, 2000, pp. 59–62, No. 19, WDM Team, Opto–Technology Lab., R&D Div.

"Undersea Communications Technology", AT&T Technical Journal, 1995, pp. 1–103, vol. 74, No. 1, AT&T.

* cited by examiner

PUMP ASSEMBLY EMPLOYING COUPLED RADIATION SOURCES FOR MULTIPLE FIBERS

This is a Continuation application Ser. No. 09/838,218, filed Apr. 20, 2001, now U.S. Pat. No. 6,618,145, the disclosure of which is hereby incorporated by reference in it entirety.

FIELD OF THE INVENTION

This invention relates to optical communications and specifically to a Raman amplifier and a pump assembly for the Raman amplifier.

BACKGROUND OF THE INVENTION

Wave division multiplexing (WDM) increases bandwidth in optical communications by providing for communication over several wavelengths or channels. For long haul optical communications the optical signal must be periodically amplified. To maximize WDM capacity, it is desirable that the optical bandwidth of the system be as wide as possible. Raman amplification is one of the amplification schemes that can provide a broad and relatively flat gain profile over the wavelength range used in WDM optical communications. (See Y. Emori, "100 nm bandwidth flat-gain Raman Amplifiers pumped and gain-equalized by 12-wavelength channel WDM Diode Unit," Electronic Lett., Vol. 35, no 16, p. 1355 (1999) and F. Koch et. al., "Broadband gain flattended Raman Amplifiers to extend to the third telecommunication window," OFC'2000, Paper FF3, (2000)). Raman amplifiers may be either distributed or discrete (See High Sensitivity 1.3 $\mu$m Optically Pre-Amplified Receiver Using Raman Amplification," Electronic Letters, vol. 32, no. 23, p. 2164 (1996)). The Raman gain material in distributed Raman amplifiers is the transmission optical fiber, while a special spooled gain fiber is typically used in discrete Raman amplifiers.

Raman amplifiers use stimulated Raman scattering to amplify a signal at a signal wavelength. In stimulated Raman scattering, radiation power from a pump radiation source is transferred to an optical signal to power from a pump radiation source is transferred to an optical signal to increase the power of the optical signal. The frequency (and therefore photon energy) of the radiation emitted by the pump radiation source is greater than the frequency of the radiation of the optical signal. This down shift in frequency from the pump frequency to the signal radiation frequency is due to the pump light interaction with optical phonons (vibrations) of the Raman gain material, i.e., the medium through which the pump radiation and the optical signal are traversing.

Figure 1:
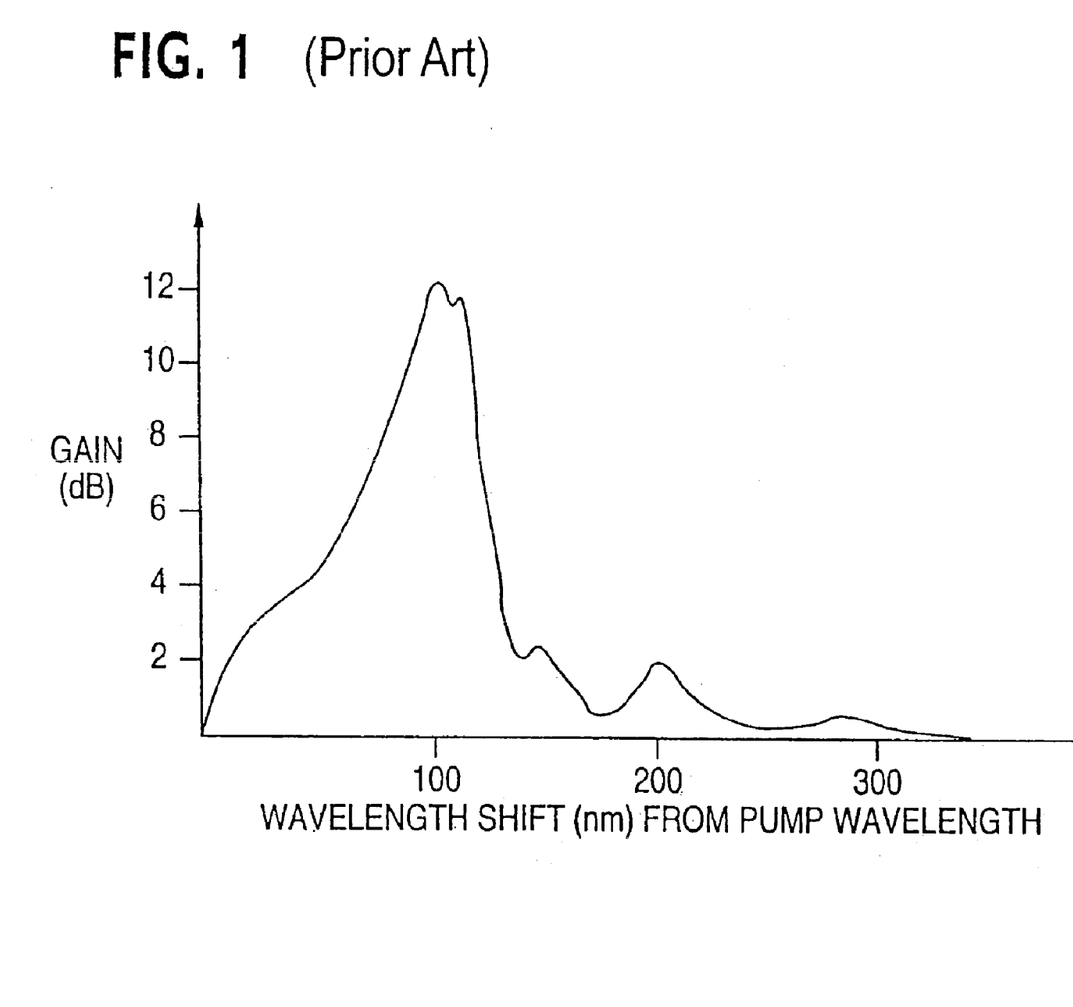
FIG. 1 is a graph showing the Raman gain coefficient as a function of wavelength shift from a pump wavelength for a silica glass fiber.

The Raman gain material in Raman amplifiers can be the transmission optical fiber itself. The Raman gain coefficient for a silica glass fiber (such as are typically used in optical communications) is shown in FIG. 1 as a function of the wavelength shift relative to a pump wavelength of around about 1400 nm. As can be seen, the largest gain occurs at about a 100 nm shift. Thus, the maximum gain for a single pump wavelength of about 1400 nm will occur at a signal wavelength of about 1500 nm. Since the optical gain is proportional to the pump intensity, the gain of the signal of a Raman amplifier is the product of the Raman gain coefficient and the pump intensity.

The gain profile having a typical bandwidth of 20–30 nm for a single pump wavelength is too narrow for WDM optical communications applications where a broad range of wavelengths must be amplified. To broaden the gain profile, Raman amplifiers employing multiple pump wavelengths over a broad wavelength range have been suggested for use in WDM optical communication applications. For example, it has been suggested to use twelve pump wavelengths to achieve a 100 nm bandwidth Raman amplifier.

In order for a flat gain profile to be achieved, the pump-pump interactions generally require that the shorter pump wavelengths have a higher pump power than the longer pump wavelengths. This is so because energy from the shorter wavelength (higher photon energy) pumps is transferred to the longer wavelength pumps due to stimulated Raman scattering. To compensate for the pump-pump energy loss at shorter wavelengths, the shorter pump wavelengths should have increased power.

Figure 2:
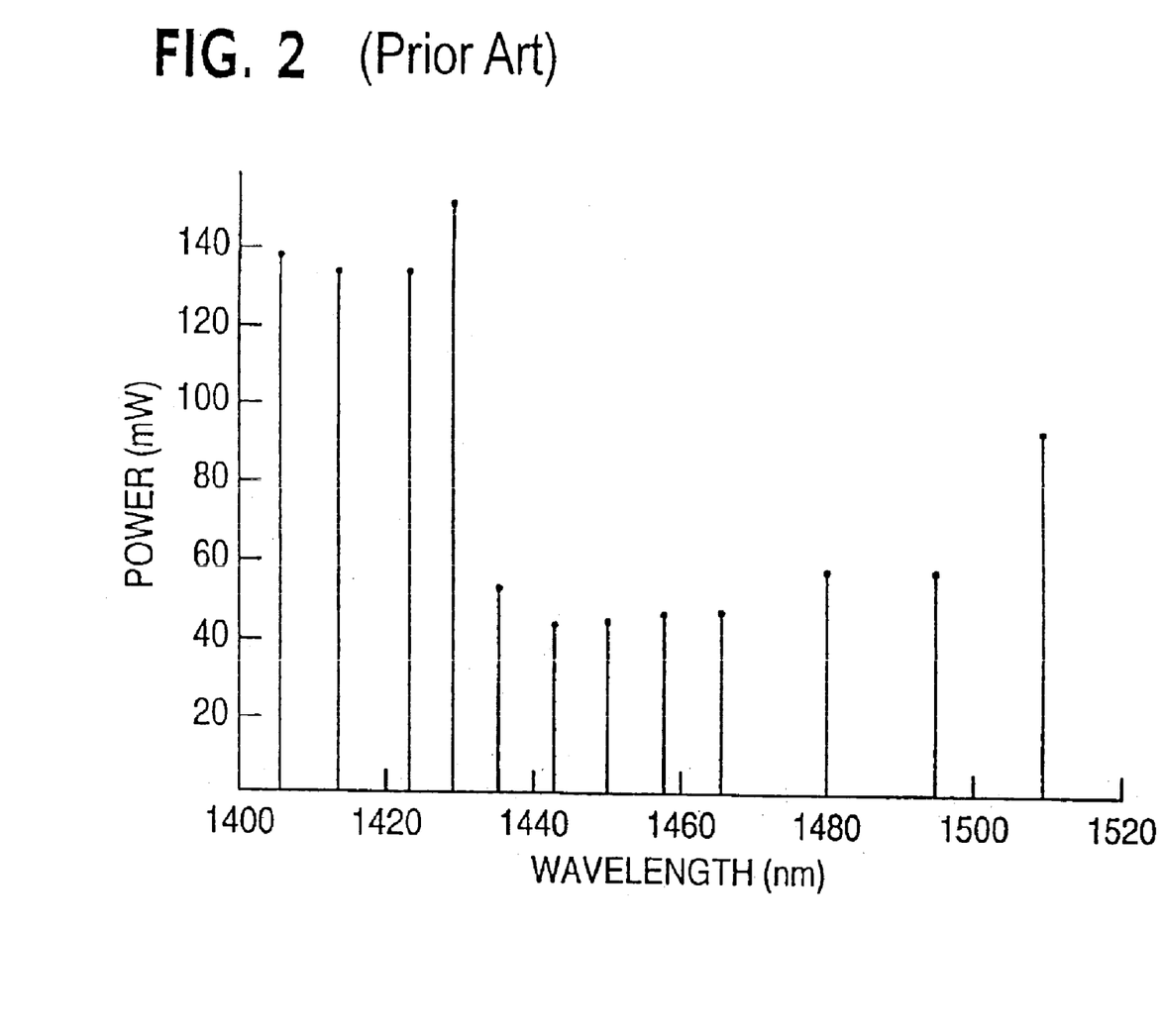
FIG. 2 shows a typical pump power-pump wavelength scheme according to a prior art system.
Figure 3:
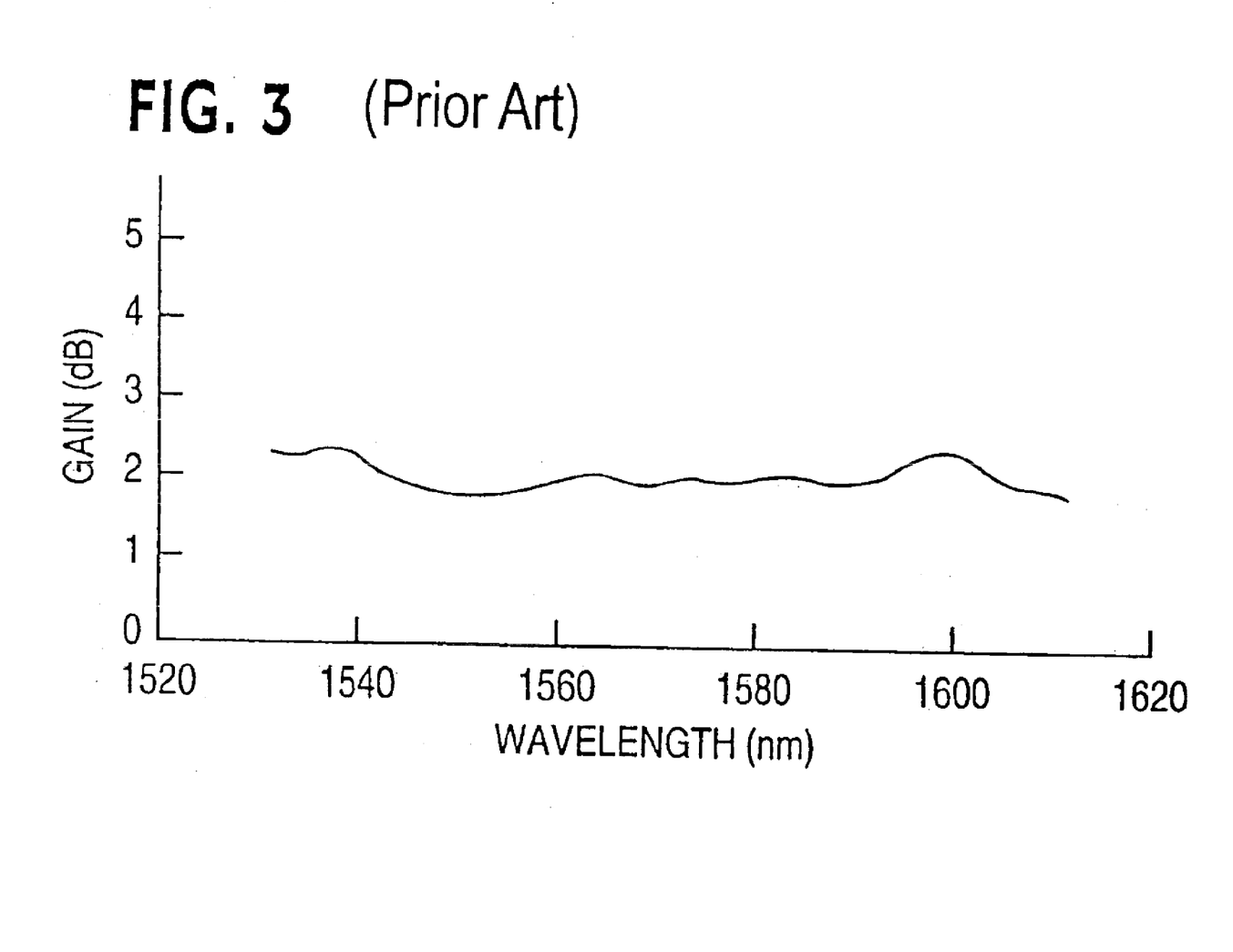
FIG. 3 illustrates the Raman gain profile for a pump power-pump wavelength scheme similar to that of FIG. 2.

A typical pump power-pump wavelength scheme to achieve a relatively flat and broad Raman gain profile is illustrated in FIG. 2 for the case of twelve pump wavelengths. As can be seen in FIG. 2, the pump power decreases for increasing wavelength. Also, the spacing between wavelengths is closer for shorter wavelengths. FIG. 3 illustrates a relatively flat and broad Raman gain profile for a pump power-pump wavelength scheme similar to that of FIG. 2. The variations on the gain spectrum result in channel-to-channel variation in the optical-signal-to-noise-ratio (OSNR) and absolute signal power. Because system performance is limited by the OSNR of the worst performing wavelength, a large variation can severely limit system length. The maximum difference of the gain within the spectral range of signals is called gain ripple. The gain ripple of an amplifier should be as small as possible. This can be achieved by properly selecting the pump wavelengths and powers of the Raman amplifier. As can be seen in FIG. 3, the gain ripple over the wavelength range of 1520 to 1620 nm is smaller than 1.5 dB.

Figure 4:
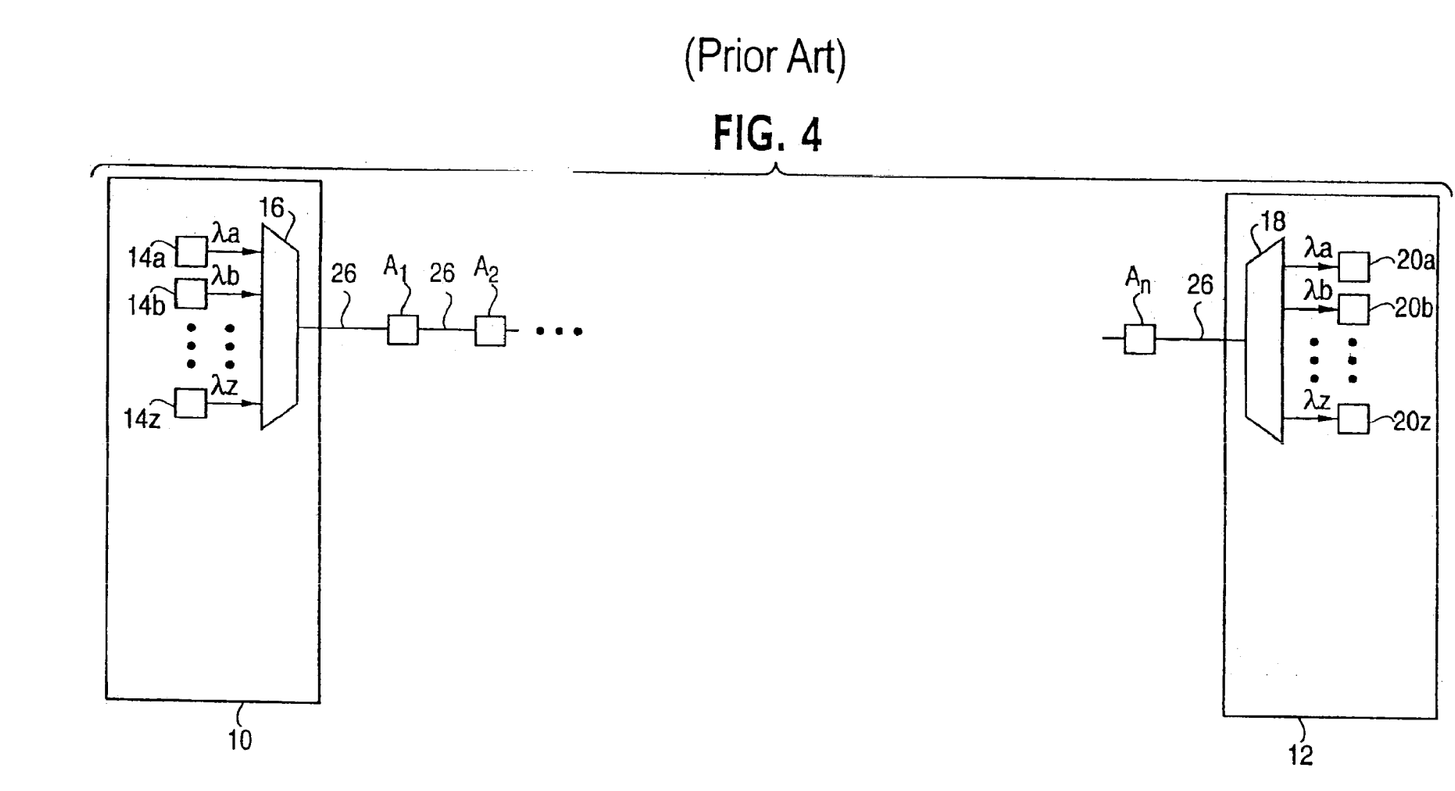
FIG. 4 is a schematic of a prior art optical communication system using Raman amplifiers for periodic amplification of the optical signal.

FIG. 4 is a schematic of a typical optical communication system using Raman amplifiers for periodic amplification of the optical signal. The system includes transmitter terminal 10 and receiver terminal 12. The transmitter terminal includes a number of optical communication transmitters 14a, 14b, . . . 14z respectively transmitting signals at optical communications wavelengths $\lambda$a, $\lambda$b, . . . $\lambda$z.

The optical signals are multiplexed by multiplexer 16 and are amplified by a series of amplifiers A1, A2, . . . An. The signals are transmitted from the transmitter 10 to the amplifiers, between the amplifiers, and from the amplifiers to the receiver 12 via transmission optical fiber 26. For distributed Raman amplification, the optical amplifier will also include transmission optical fiber. The optical signals are then demultiplexed by demultiplexer 18 of receiver 12 to respective optical communications receivers 20a, 20b, . . . 20z. The demultiplexer 18 sends optical communications wavelengths $\lambda$a, $\lambda$b, . . . $\lambda$z to respective optical communications receivers 20a, 20b, . . . 20z.

Although FIG. 4 shows signals directed from transmitter terminal 10 to receiver terminal 12 for ease of illustration, in general the transmitter terminal 10 and receiver terminal 12 are typically transmitter/receiver terminals for bidirectional communication. In this case each of the transmitter/receiver terminals will have transmitters as well as receivers and both a multiplexer and demultiplexer.

Figure 5:
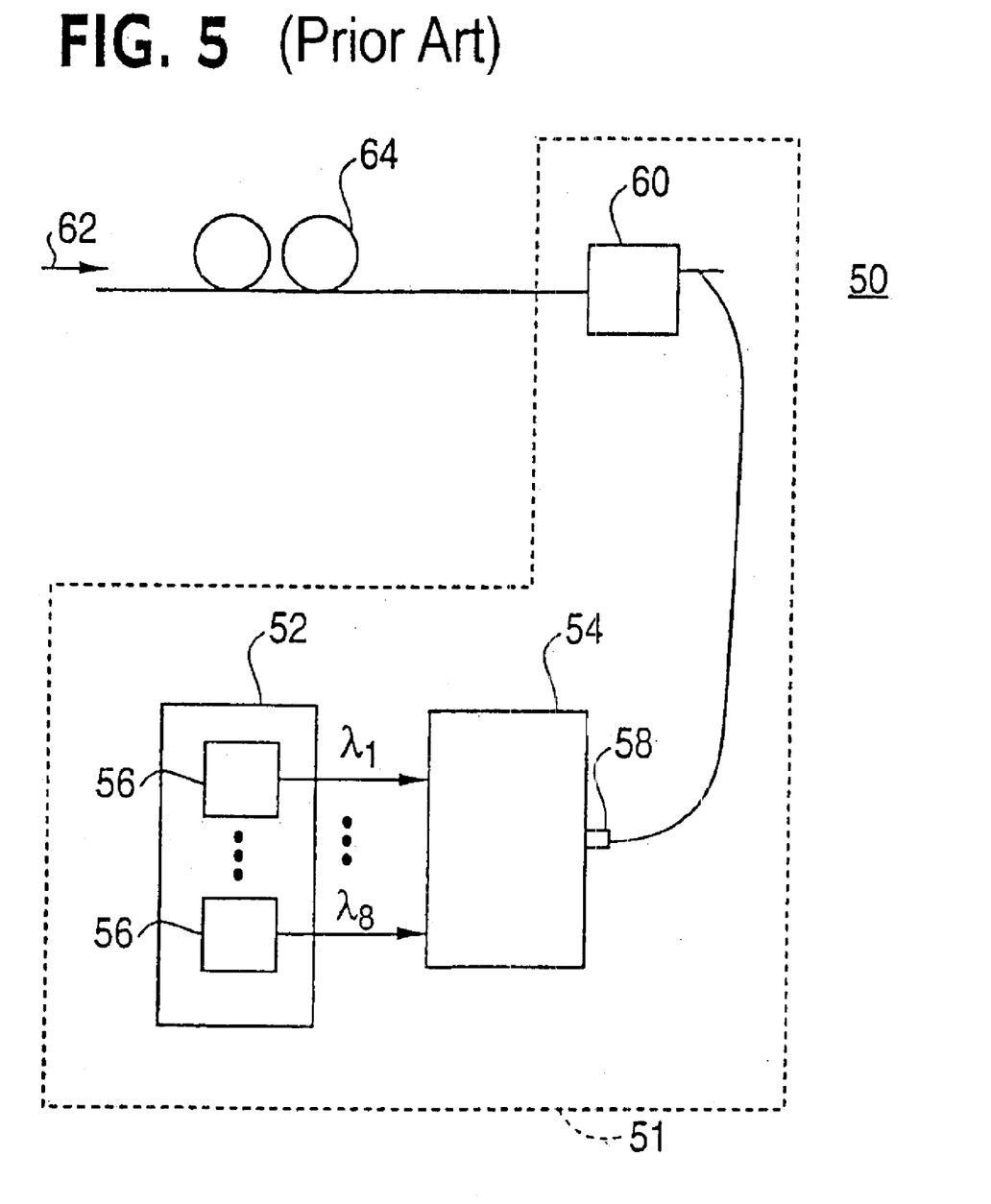
FIG. 5 is a schematic of a typical amplifier employed in the optical communication system of FIG. 4.

FIG. 5 is a schematic of a typical distributed Raman optical amplifier 50 employed as one of the amplifiers in the series of amplifiers A1, A2, . . . An in the system of FIG. 4. The amplifier 50 includes optical pump assembly 51 (shown enclosed by dashed lines) and transmission fiber 64. In this amplification scheme, the pump assembly 51 includes a pump radiation source 52 that provides, for example, twelve different pump wavelengths λ1 through λ12. Specifically, the pump radiation source 52 comprises twelve lasers 56 that each emit radiation at a different wavelength of the wavelengths λ1 through λ12. The radiation from the individual radiation sources 56 of the pump radiation source 52 are then coupled or combined at pump radiation combiner 54, and the coupled radiation is output at pump radiation combiner output 58.

The coupled radiation has a coupled radiation profile that is a combination of the individual radiation profiles of the radiation input into the pump radiation combiner 54. The pump radiation profile, that will be coupled with the optical signal to be amplified, is therefore the coupled radiation profile in this case. Thus, the pump radiation profile is output from output 58. The pump radiation profile from output 58 is then coupled at pump-signal combiner 60 with the optical signal 62. Optical signal 62, i.e., the data signal, propagates in the transmission optical fiber 64 in a direction opposite to the radiation of the pump radiation profile. The optical signal is amplified along transmission optical fiber 62. Thus, the amplifier 50 and pump assembly 51 provide amplification for a single optical transmission path.

SUMMARY OF THE INVENTION

It would be desirable to provide an optical amplifier, such as a Raman amplifier, including a pump assembly that could amplify optical signals along several optical transmission paths. It would further be desirable to amplify along several optical transmission paths with the same set of radiation sources, such as lasers. It would further be desirable to provide an optical amplifier including a pump assembly that could allow for increased pump source redundancy without increasing the number of pump sources per optical transmission path amplified. In certain implementations it would be desirable to provide an optical amplifier including a pump assembly that would reduce gain ripple by providing an increased number of pump wavelengths.

According to one embodiment of the invention there is provided a pump assembly for an optical amplifier. The pump assembly comprises a plurality of pump radiation sources, each pump radiation source adapted to produce radiation having a set of pump wavelengths and pump powers corresponding to the respective pump wavelengths, wherein at least one set is different from at least one other set; a plurality of pump radiation combiners, each pump radiation combiner coupling the radiation of a respective set of pump wavelengths of a respective source of the plurality of pump radiation sources and outputting the respective coupled radiation having coupled radiation profiles via a respective pump radiation combiner output; a P×P coupler, optically coupled to the outputs of the pump radiation combiners, that receives the coupled radiation from the pump radiation combiners and outputs P pump radiation profiles to respective of P coupler outputs; and a plurality of pump-signal combiners, each optically coupled to a respective coupler output of the P coupler outputs, which are adapted to couple an optical signal with the respective pump radiation profiles.

According to another embodiment of the invention there is provided an optical system. The optical system comprises an optical signal transmitter adapted to transmit multiple optical signals, the multiple optical signals having respective different wavelengths; an optical amplifier adapted to amplify at least one of the multiple optical signals; and an optical signal receiver adapted to receive the multiple optical signals including the amplified at least one of the multiple optical signals. The optical amplifier comprises a plurality of pump radiation sources, each pump radiation source adapted to produce radiation having a set of pump wavelengths and pump powers corresponding to the respective pump wavelengths, wherein at least one set is different from at least one other set; a plurality of pump radiation combiners, each pump radiation combiner coupling the radiation of a respective set of pump wavelengths of a respective source of the plurality of pump radiation sources and outputting the respective coupled radiation having coupled radiation profiles via a respective pump radiation combiner output; a P×V coupler, optically coupled to the outputs of the pump radiation combiners, that receives the coupled radiation from the pump radiation combiners and outputs V pump radiation profiles to respective of V coupler outputs; and a plurality of pump-signal combiners, each optically coupled to a respective coupler output of the V coupler outputs, which are adapted to couple an optical signal with the respective pump radiation profiles.

According to another embodiment of the invention there is provided a method of amplifying optical signals. The method comprises providing a plurality of input radiation signals into the inputs of a P×V coupler, each of the input radiation signals having a respective input radiation profile having a set of pump wavelengths and pump powers corresponding to the respective wavelengths, wherein at least one set is different from at least one other set; providing V output pump radiation profiles from the outputs of the P×V coupler; and amplifying an optical data signal by coupling at least one of the V output pump radiation profiles with the optical data signal.

According to another embodiment of the invention there is provided a pump assembly for an optical amplifier. The pump assembly comprises a plurality of pump radiation sources, each pump radiation source adapted to produce radiation having a set of pump wavelengths and pump powers corresponding to the respective pump wavelengths, wherein at least one set is different from at least one other set; a plurality of pump radiation combiners, each pump radiation combiner coupling the radiation of a respective set of pump wavelengths of a respective source of the plurality of pump radiation sources and outputting the respective coupled radiation having coupled radiation profiles via a respective pump radiation combiner output; a P×V coupler, optically coupled to the outputs of the pump radiation combiners, that receives the coupled radiation from the pump radiation combiners and outputs V pump radiation profiles to respective of V coupler outputs; and a plurality of V pump-signal combiners, each optically coupled to a respective coupler output of the V coupler outputs, which are adapted to couple an optical signal with the respective pump radiation profiles.

According to another aspect of the invention, and depending on the radiation source redundancy desired for the optical amplifier or pump assembly, all, most, some, or none of the wavelengths of the sets of wavelengths may be the same or adjacent to other wavelengths of the sets of wavelengths.

DETAILED DESCRIPTION OF THE PREFERRED EMBODIMENTS

The pump assembly of the present invention allow for coupling to multiple fiber transmission paths. The multiple fiber transmission paths share the radiation sources of the pump assembly. Thus, it is possible in some embodiments to reduce the number of pump radiation sources per fiber transmission path while still maintaining a desired spectral profile of the combined pump radiation sources. Also, in some embodiments redundancy of radiation pump sources can be increased while still maintaining a low number of radiation sources per optical transmission path amplified. Specific embodiments are described below.

Figure 6:
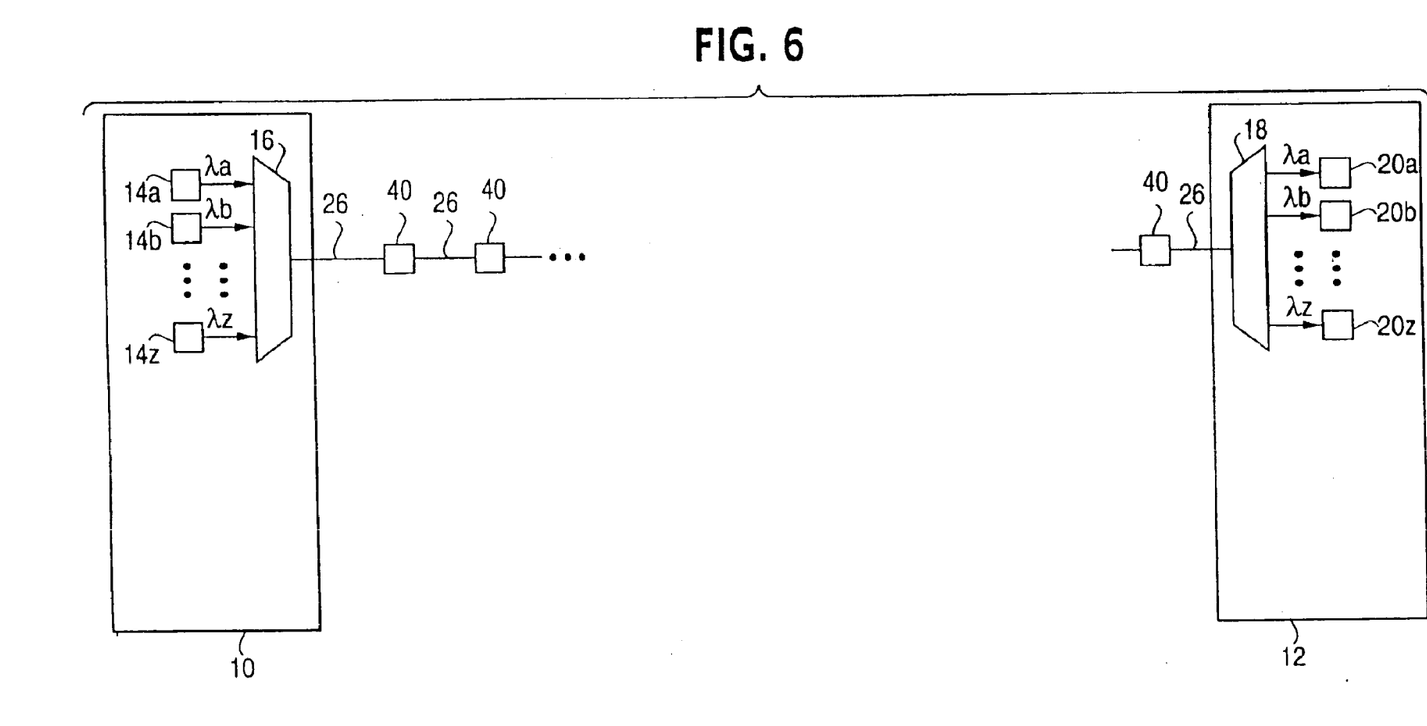
FIG. 6 is a schematic of an optical amplification system according to an embodiment of the invention.

FIG. 6 is a schematic of an optical communication system using Raman amplifiers according to a preferred embodiment of the present invention. The schematic is similar to that of the FIG. 4 system. One large difference, however, is that the amplifiers 40 of FIG. 6 are different than those of the FIG. 4 system because the amplifiers contain a pump assembly with a P×P or P×V coupler that allows coupling to multiple fiber transmission paths, as will be described in more detail below. A P×P coupler is a coupler with P inputs and P outputs. A P×V coupler is a coupler with P inputs and V outputs. The FIG. 6 system includes transmitter terminal 10 and receiver terminal 12. The transmitter terminal includes a number of optical communication transmitters 14a, 14b, . . . 14z respectively transmitting signals at optical communications wavelengths λa, λb, . . . λz. (It should be noted that the letter z does not imply that λz is the twenty-sixth wavelength, i.e., z may be smaller or larger than twenty-six).

The optical signals are multiplexed by multiplexer 16 and are amplified by a series of amplifiers 40. The signals are transmitted from the transmitter 10 to the amplifiers, between the amplifiers, and from the amplifiers to the receiver 12 via one or more transmission optical fibers 26. For distributed Raman amplification, the optical amplifier will also include transmission optical fiber. The optical signals are then demultiplexed by demultiplexer 18 of receiver 12 to respective optical communications receivers 20a, 20b, . . . 20z. The demultiplexer 18 sends optical communications wavelengths λa, λb, . . . λz to respective optical communications receivers 20a, 20b, . . . 20z.

Although FIG. 6 shows signals directed from transmitter terminal 10 to receiver terminal 12 for ease of illustration, in general the transmitter terminal 10 and receiver terminal 12 are typically transmitter/receiver terminals for bidirectional communication. In this case each of the transmitter/receiver terminals will have transmitters as well as receivers and both a multiplexer and demultiplexer.

Figure 7:
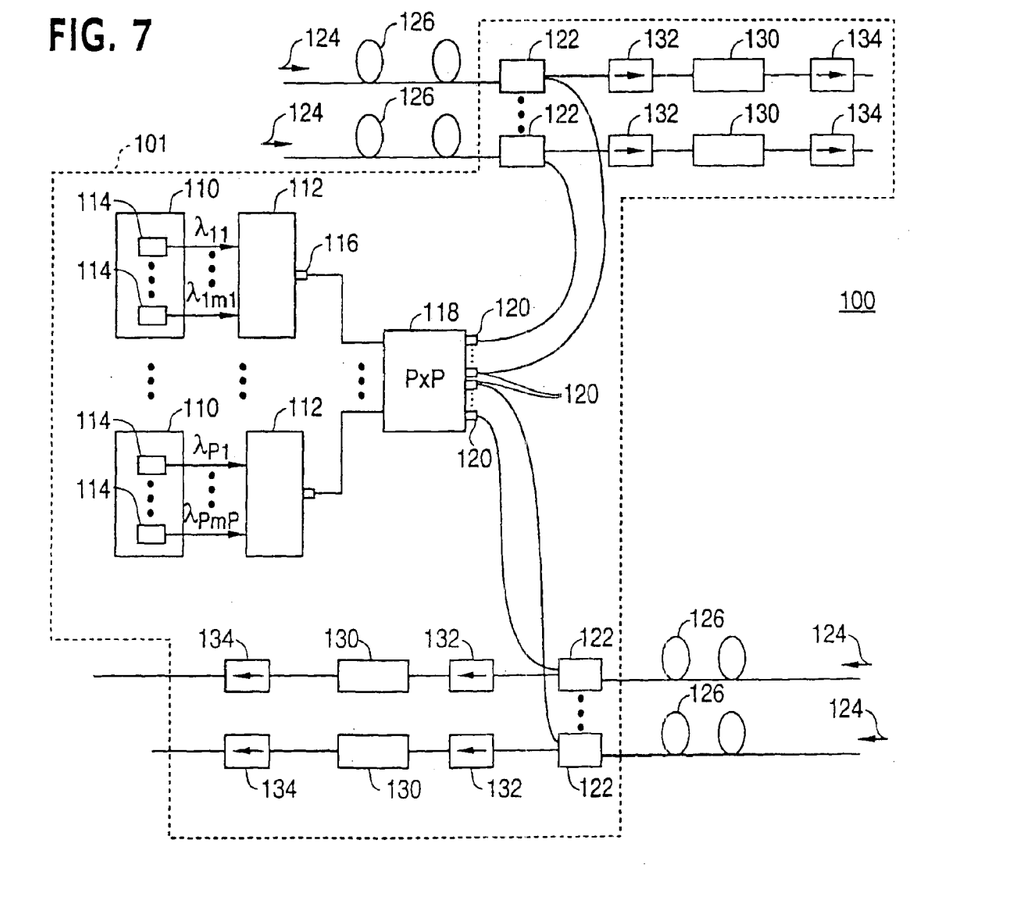
FIG. 7 is a schematic of an amplifier including a pump assembly containing a P×P coupler according to a preferred embodiment of the invention.

Preferred examples of the amplifier 40 are now described. FIG. 7 illustrates one preferred example an optical amplifier 100 that may be used as the amplifier 40 in the system of FIG. 6. The amplifier 100 includes optical pump assembly 101 (shown enclosed by dashed lines) and transmission fiber 126. The pump assembly 101 allows for coupling to, and amplification of, up to P fiber transmission paths, as described below.

The pump assembly 101 includes a number N of pump radiation sources 110 optically coupled to respective pump radiation combiners 112. In this embodiment the number of pump radiation combiners 112 is also N. N is any integer greater than one. Alternatively, the number of combiners and pump radiation sources 110 may not be the same number.

Each of the pump radiation sources 110 produces radiation having a set of wavelengths $\lambda_{i1}$ to $\lambda_{imi}$, where i designates the ith pump radiation source, and mi is the number of wavelengths generated by the ith pump radiation source. For example, the first pump radiation source generates a set of wavelengths $\lambda_{11}$ to $\lambda_{1m1}$ (m1 is the number of wavelengths generated by the first pump radiation source), while the Nth pump radiation source generates a set of wavelengths $\lambda_{N1}$ to $\lambda_{NmN}$ (mN is the number of wavelengths generated by the Nth pump radiation source). In general, the radiation corresponding to each wavelength λ will not be only the wavelength λ, but a range of wavelengths with λ as the peak wavelength. This is so because a radiation source providing the wavelength λ will not provide an infinitely narrow range of wavelengths. Thus, it is understood that radiation generated at a wavelength λ will include a finite bandwidth of wavelengths around λ.

The pump radiation sources 110 may each comprise one or more individual radiation emitters 114. These individual radiation emitters 114 may be lasers or light emitting diodes, for example. The lasers may be fiber lasers, fiber coupled microchip lasers, or semiconductor lasers, for example.

Each of the pump radiation sources 110 produces radiation having a set of pump wavelengths and pump powers corresponding to the pump wavelengths. The pump wavelengths and pump powers of each set are generally different from those of another set. Thus, in general, it is possible to have a large number of different pump wavelengths and/or pump powers produced by the pump assembly 101. As defined herein, one set of wavelengths is said to be different from another set of wavelengths if the sets of wavelengths are not identical. For example, a first set of four wavelengths $\lambda_{11}$ through $\lambda_{14}$ is different from a second set of four wavelengths, $\lambda_{21}$ through $\lambda_{24}$, if $\lambda_{11}$ through $\lambda_{13}$ are identical to $\lambda_{21}$ through $\lambda_{23}$, respectively, but $\lambda_{14}$ is different from $\lambda_{24}$. Of course, all of the wavelengths of a set may be different from the corresponding wavelengths of all the other sets, i.e, the sets of wavelengths may be entirely different.

The individual radiation emitters 114 of a particular pump radiation source 110 emit radiation at the respective wavelengths of the set of wavelengths of that particular pump radiation source. For example, for the ith pump radiation source providing radiation at wavelengths $\lambda_{i1}$ to $\lambda_{imi}$, the individual radiation emitters 114 of the ith pump radiation source 110 respectively emit radiation at wavelengths $\lambda_{i1}$ to $\lambda_{imi}$.

Alternatively, any or all of the pump radiation sources 110 may comprise a single radiation emitter that simultaneously emits radiation at the wavelengths of the set of wavelengths of the pump radiation emitter. For example, the ith pump radiation source may comprise a single radiation source that simultaneously emits radiation at wavelengths $\lambda_{i1}$ to $\lambda_{imi}$. In this regard the pump radiation source may be a lamp.

Each pump radiation combiner 112 couples or combines the radiation at the wavelengths of the set of wavelengths of a respective pump radiation source 110. For example, the ith pump radiation combiner 112 couples the radiation from the ith pump radiation source 110. However, a combiner may couple the radiation of a plurality of sources 110, or a plurality of combiners 112 may couple radiation from a single source 110. The combiner 112 may be, for example, a WDM multiplexer.

The coupled radiation provided by a combiner 112 is output at a pump radiation combiner output 116 of the combiner. There are N pump radiation combiner outputs 116, one for each of the N pump radiation combiners 112. The coupled radiation at each output 116 will have its own coupled radiation profile, which will be a combination of the radiation profiles of the radiation input into the combiner 112.

The N pump radiation combiner outputs 116 are optically coupled to a P×P coupler 118. The coupler 118 may be, for example, a fused fiber coupler or a waveguide coupler. The number P may be a power of 2, i.e., $P=2^Q$, where Q is a positive integer. For example, P may be two or four or eight. Alternatively, the number P may be a positive integer greater than 1, where P is not a power of 2. N may be equal to, less than, or greater than P. Preferably N is equal to P. However, N need not be equal to P and may be less than P, for example, so that not all of the inputs of the P×P coupler are used.

The P×P coupler 118 receives the coupled radiation from the N combiners 112 via the pump radiation combiner outputs 116. The P×P coupler 118 outputs pump signals via P coupler outputs 120. Each of the pump signals has a respective pump radiation profile. Because the P×P coupler 118 combines the coupled radiation profiles input into the P×P coupler, the output from each of the P coupler outputs 120 has the spectral shape of the combined coupled radiation profiles. Thus, the spectral shape of each of the output P pump radiation profiles is the same, and that spectral shape is the combination of the coupled radiation profiles. Therefore, each of the P pump radiation profiles has a contribution from all of the individual wavelengths of the N pump radiation sources 110.

Of course the power of the individual pump radiation profiles will be less than the power of the combination of the coupled radiation profiles, because the P×P coupler 118 splits the total input power among the P coupler outputs 120. Nevertheless, the spectral shape of each of the P pump radiation profiles is the same, and that spectral shape is the shape of the combination of the coupled radiation profiles.

In many applications it will be desirable to have the same power for each of the P pump radiation profiles. However, in some applications, it may be desired to have a different power for at least some of the P pump radiation profiles output by the coupler 118. The optical amplifier may couple to and amplify up to P optical fiber transmission paths. This is accomplished as described below.

Respective pump radiation profiles are output from respective P×P coupler outputs 120 to respective of P pump-signal combiners 122. Each of the pump-signal combiners 122 optically couples an optical signal with a respective pump radiation profile output by the coupler 118. Specifically, an optical signal 124 propagates along a respective optical fiber 126 to a respective pump-signal combiner 122, where it is combined with a respective pump radiation profile. Preferably, there are P fibers 126, carrying respective optical signals 124, optically connected to the pump assembly 101 of this embodiment. However, there may be less than P fibers 126. The pump radiation counterpropagates with respect to a respective optical signal 124 and amplifies the signal 124 in the fiber 126. The optical fiber 126 may be a transmission fiber of the optical communication system of FIG. 6, for example. However, if desired, the amplification may occur in a special Raman fiber, i.e., the amplifier 100 may be a discrete Raman amplifier.

The pump assembly 101 of FIG. 7 couples pump radiation profiles to up to P different optical fiber transmission paths. Thus, the pump assembly 101 allows for amplification of optical signals along P optical paths, not just a single path as in the prior art. Because the single pump assembly 101 may amplify signals for P separate paths, the pump assembly 101 allows both for redundancy and for a flatter gain profile overall, if desired, while still requiring less pump wavelength sources, such as lasers, per optical path than the prior art. This redundancy advantage is due in large part to the addition of the P×P coupler (P×V coupler in later described embodiments) to the pump assembly which allows up to P fibers (V fibers in later described embodiments) to share the pump wavelengths of the pump assembly.

The amplifier 100 can provide a flatter gain profile, or some other desired gain profile, over a desired first wavelength range with fewer lasers per optical path amplified because the radiation provided by the lasers is shared by the optical paths. The flatness is largely determined by the total number of pump wavelengths provided by the pump assembly because all the wavelengths together will determine the spectral shape of the pump signal provided to the transmission fibers. In general, the total number of different wavelengths can be as large as the total number of radiation emitters (or larger if radiation emitters that provide more than one wavelength are used).

On the other hand, the number of pump radiation emitters per amplified optical path is the total number of pump radiation emitters divided by P (or V for a P×V coupler). Therefore the total number of pump wavelengths provided by the pump assembly may remain large while the number of pump radiation emitters, such as lasers, per optical path is reduced. Thus, the cost of amplification per optical path can be reduced.

Further, because the total number of pump wavelengths for a single amplifier can be large, the amplification system can provide redundancy. This is so because with a large number of wavelengths, each of the wavelengths may have another wavelength relatively close by. Thus, the failure of a single pump wavelength emitter or source will not significantly alter the shape of the gain profile. Furthermore, it is anticipated that the pump assembly of the present invention may be designed so that if one pump wavelength emitter or source fails, the power of another pump wavelength emitter or source emitting at the same or an adjacent wavelength is increased. In this case the failure of a single pump wavelength emitter will have even less effect on the shape of the gain profile.

For many applications, such as applications involving wave division multiplexing (WDM) over a broad range of wavelengths, it will be desired to have a substantially flat gain profile over the broad range of wavelengths, for example, with a gain ripple less than 0.5 dB peak-to-peak. For example, it may be desired to have a substantially flat gain profile over a first range of wavelengths with a particular range width. Preferably the range width is between 20 and 120 nm. For example, the wavelength range may be 1500 to 1620 nm with a range width of 120 nm. However, the present invention is not limited to an amplification gain profile that is substantially flat, and the amplification gain profile can have any shape desired.

If a substantially flat gain profile is desired, the individual coupled radiation profiles from the respective pump radiation combiners 112 should provide gain profiles that are complementary to each other. In other words the superposition of the gain profiles due to individual radiation profiles will provide a substantially flat gain profile. It should be noted that the superposition of the gain profiles is not generally a linear superposition because of pump-pump interactions.

The pump assembly 101 may optionally include P gain flattening elements 130 to further improve the flatness of the gain profile. The gain flattening element may be a fiber Bragg grating, for example. The gain flattening elements 130 are positioned between respective optional first isolators 132 and second isolators 134. The first and second isolators 132 and 134 act to allow electromagnetic radiation to pass only in the direction that the signal 124 propagates. After the signal 124 passes through the second isolator, the signal 124 propagates along a transmission optical fiber (not shown).

Figure 8:
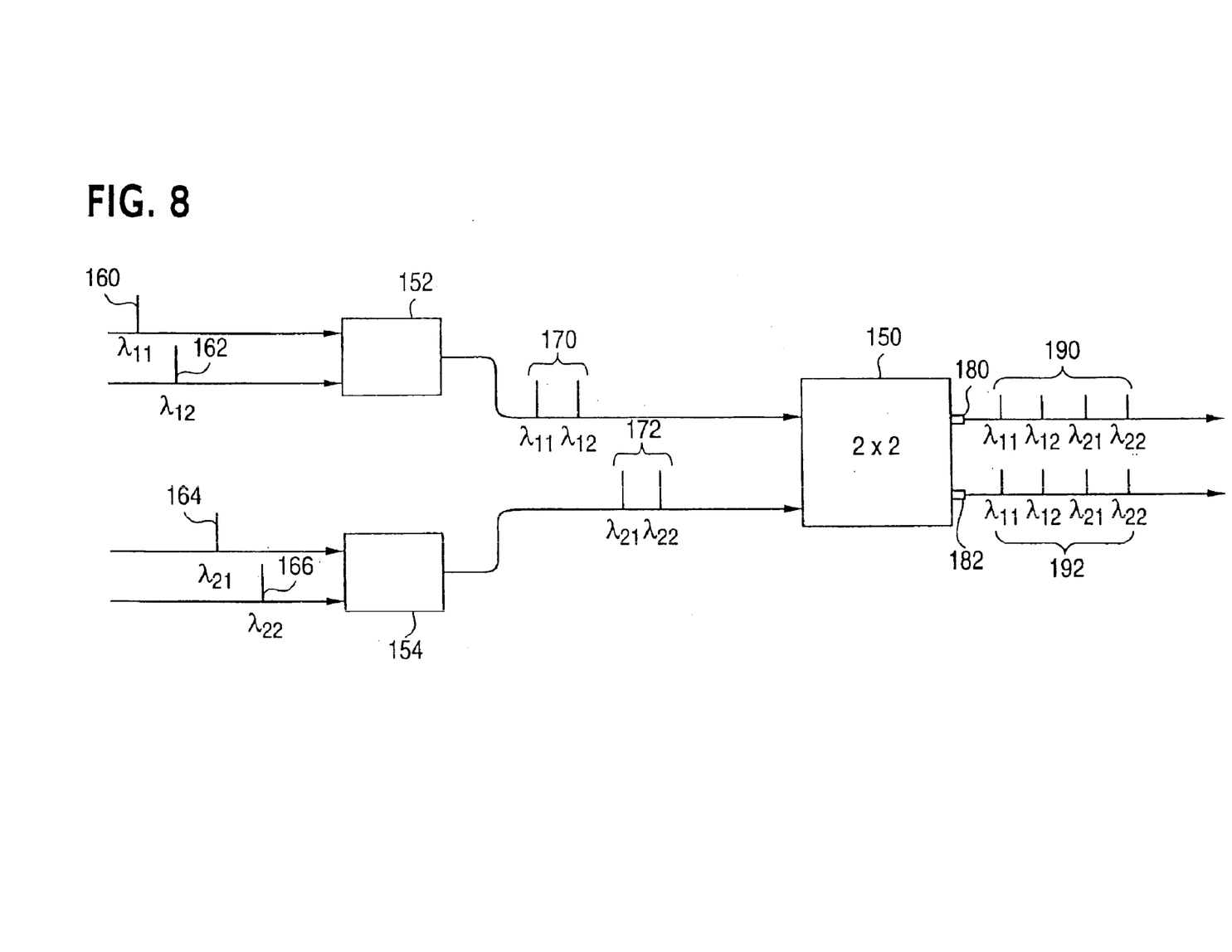
FIG. 8 is a schematic that illustrates the concept of the coupled radiation profiles and the pump radiation profiles for embodiments of the present invention.

FIG. 8 is a schematic that illustrates the concept of the coupled radiation profiles and the pump radiation profiles. The example of FIG. 8 includes a 2×2 coupler 150. Two pumps 160 and 162, having respective wavelengths $\lambda 11$ and $\lambda 12$, are input into a first pump radiation combiner 152 and two other pumps 164 and 166, having respective wavelengths $\lambda 21$ and $\lambda 22$, are input into a second pump radiation combiner 154. Thus, there are two pump radiation sources, each connected to a respective combiner 152 and 154. Each source contains two emitters, such as two lasers. In FIG. 8, the power of a particular wavelength is indicated by the height of the line at the wavelength. The magnitude of the power of each of the four pumps is the same in the example of FIG. 8, and the wavelengths are chosen to increase from $\lambda 11$ to $\lambda 12$ to $\lambda 21$ to $\lambda 22$, for ease of illustration. Of course, the powers and peak wavelength arrangement may be different as desired.

The first pump wavelength combiner 152 couples the pumps 160 and 162 to produce a first coupled radiation profile 170, and the second pump radiation combiner 154 couples the pumps 164 and 166 to produce a second coupled radiation profile 172. The first coupled radiation profile 170 is simply the linear combination of the profiles of the pumps 160 and 162, while the second coupled radiation profile 172 is simply the linear combination of the profiles of the pumps 164 and 166. For ease of illustration in this example, we assume that there is no power loss at the combiners 152 and 154. Of course in practice there will be a power loss at the combiners so that the total power output from a combiner will be less than the power input into the combiner.

As can be seen in FIG. 8, the first coupled radiation profile 170 has a power at $\lambda 11$ equal to the power of pump 160 and a power at $\lambda 12$ equal to the power of pump 162. Similarly, the second coupled radiation profile 172 has a power at $\lambda 21$ equal to the power of pump 164 and a power at $\lambda 22$ equal to the power of pump 166.

The first and second coupled radiation profiles 170 and 172 are then input into 2×2 coupler 150. The 2×2 coupler 150 has outputs, 180 and 182, which output respective pump radiation profiles 190 and 192. In the example of FIG. 8 the pump radiation profiles 190 and 192 are identical and have the profile of a combination of the coupled radiation profiles 170 and 172. The combination of the coupled radiation profiles 170 and 172 is the linear superposition of the profiles 170 and 172. For ease of illustration in this example, we assume that there is no power loss at the 2×2 coupler 150. Of course in practice there will be a power loss at the coupler 150 so that the total power output from the coupler 150 will be less than the power input into the coupler 150.

Because the power of the combination of the coupled radiation profiles 170, 172 is split between the two outputs 180 and 182, each of the pump radiation profiles 190 and 192 has one-half the power of the combination of the coupled radiation profiles 170 and 172. Thus, the power at each of the wavelengths $\lambda 11$ through $\lambda 22$ for either of the pump radiation profiles 190, 192 will be one-half of the power of the pump input at that wavelength into one of the radiation combiners 152 or 154. Of course in general for a P×P coupler at a given wavelength the output power is 1/P times the input power at the given wavelength. For a P×V coupler (described later) output power is 1/V times the input power at the given wavelength.

Also, as can be seen, the pump radiation profiles 190 and 192 include contributions from all of the wavelengths $\lambda 11$ through $\lambda 22$.

Figure 9:
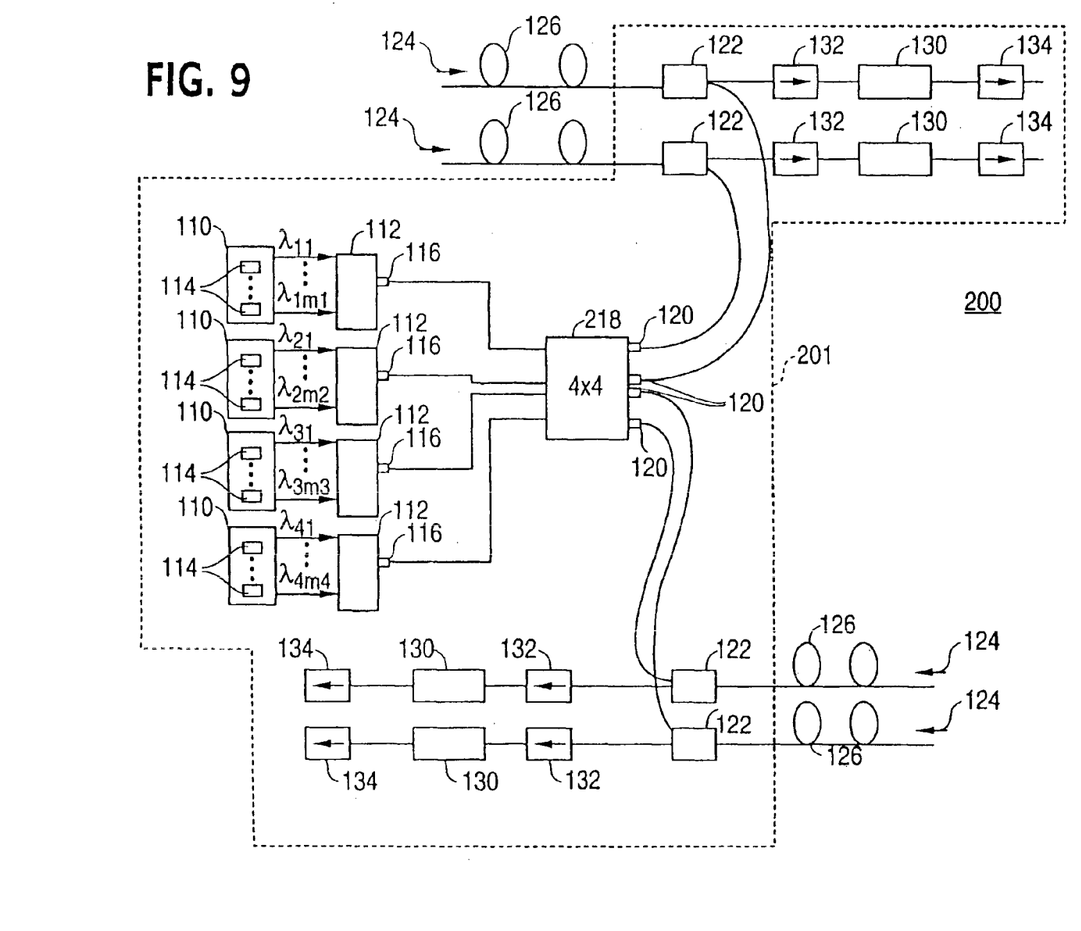
FIG. 9 is a schematic of an amplifier including a pump assembly containing a 4×4 coupler according to a preferred embodiment of the invention.

FIG. 9 is a schematic of another preferred embodiment of the present invention where the amplifier contains a 4×4 coupler. Thus, this amplifier may amplify up to four transmission fiber paths. The embodiment of FIG. 9 is similar to that of FIG. 7 except that the specific value of P is four. Thus, the description of like features with like reference numerals may be omitted for the sake of brevity. The optical amplifier 200 in FIG. 9 includes optical pump assembly 201 (shown enclosed by dashed lines) and transmission fiber 126. The optical pump assembly 201 includes four pump radiation sources 110 optically coupled to respective pump radiation combiners 112. In this embodiment the number of pump radiation combiners 112 is also four. The optical amplifier 200 may be used as the amplifier 40 in the system of FIG. 6.

Returning to FIG. 9, each of the pump radiation sources 110 produces radiation having a set of wavelengths $\lambda_{i1}$ to $\lambda_{imi}$, where i designates the ith pump radiation source, and mi is the number of wavelengths generated by the ith pump radiation source.

The first through fourth pump radiation sources 110 produce radiation having first through fourth sets, respectively, of pump wavelengths and pump powers corresponding to the pump wavelengths. Each set of pump wavelengths may be different from each other set of pump wavelengths. Alternatively, some of the sets of pump wavelengths may be different from each other, while other sets are identical.

Each of the four pump radiation combiners 112 couples or combines the radiation at the wavelengths of the set of wavelengths of its respective pump radiation source 110. For example, the fourth pump radiation combiner 112 couples the radiation from the fourth pump radiation source 110.

The coupled radiation provided by a combiner 112 is output at a pump radiation combiner output 116. There are four pump radiation combiner outputs 116, one for each of the four pump radiation combiners 112. The coupled radiation at each output 116 will have its own coupled radiation profile, which will be a combination of the radiation profiles of the radiation input into the combiner 112.

The four pump radiation combiner outputs 116 are optically coupled to a 4×4 coupler 218. The 4×4 coupler 218 receives the coupled radiation from the four combiners 112 via the pump radiation combiner outputs 116. The 4×4 coupler 218 outputs a set of pump signals via the four coupler outputs 120. Each of the pump signals has a respective pump radiation profile. Because the 4×4 coupler 218 combines the coupled radiation profiles input into the 4×4 coupler, the output from each of the four coupler outputs 120 has the spectral shape of the combined coupled radiation profiles. Thus, the spectral shape of each of the four pump radiation profiles is the same, and that spectral shape is the shape of the combination of the four coupled radiation profiles. Therefore, each of the four pump radiation profiles has a contribution from all of the individual wavelengths of four pump radiation sources.

Of course the power of the individual pump radiation profiles output by the coupler 218 will be less than the power of the combination of the coupled radiation profiles, because the 4×4 coupler 218 splits the total input power among the four coupler outputs 120. In this case each of the four coupler outputs will have one-fourth the total power (excluding power loss at the combiner).

The pump assembly 201 couples to up to four fibers 126, as described below. Respective pump radiation profiles are output from respective 4×4 coupler outputs 120 to respective of the four pump-signal combiners 122. Each of the pump-signal combiners 122 optically couples an optical signal with a respective pump radiation profile output by the coupler 218. Specifically, an optical signal 124 propagates along a respective fiber 126 to a respective pump-signal combiner 122, where it is combined with a respective pump radiation profile. There are four fibers 126, carrying respective optical signals 124, optically connected to the pump assembly 201 of this embodiment. The pump radiation profile radiation counterpropagates with respect to a respective optical signal 124 and amplifies the signal 124 in the fiber 126. The pump assembly 201 may optionally include gain flattening elements 130 and isolators 132 and 134 in a similar fashion to the embodiment of FIG. 7.

Figure 10A:
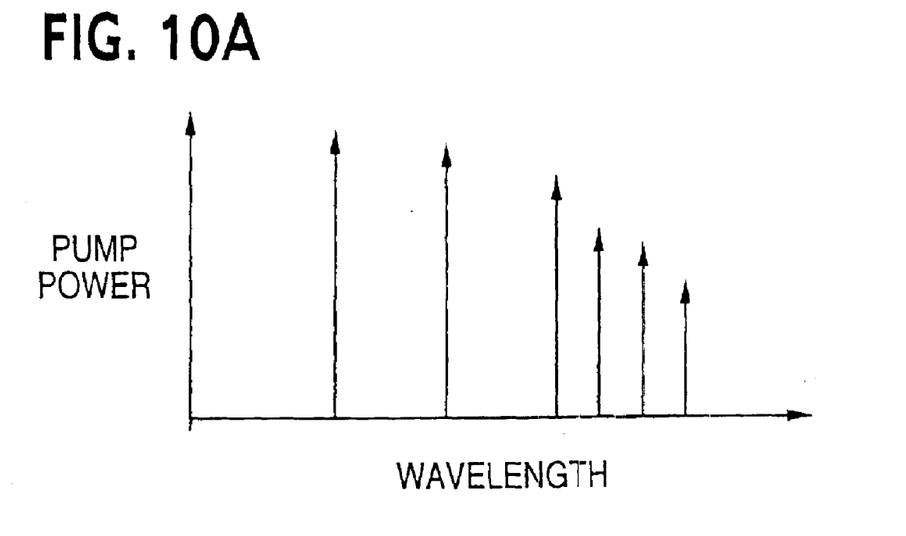
FIGS. 10A and 10B respectively illustrate an exemplary pump power-pump wavelength scheme for an amplifier containing a 2×2 coupler according to an embodiment of the invention.
Figure 10B:
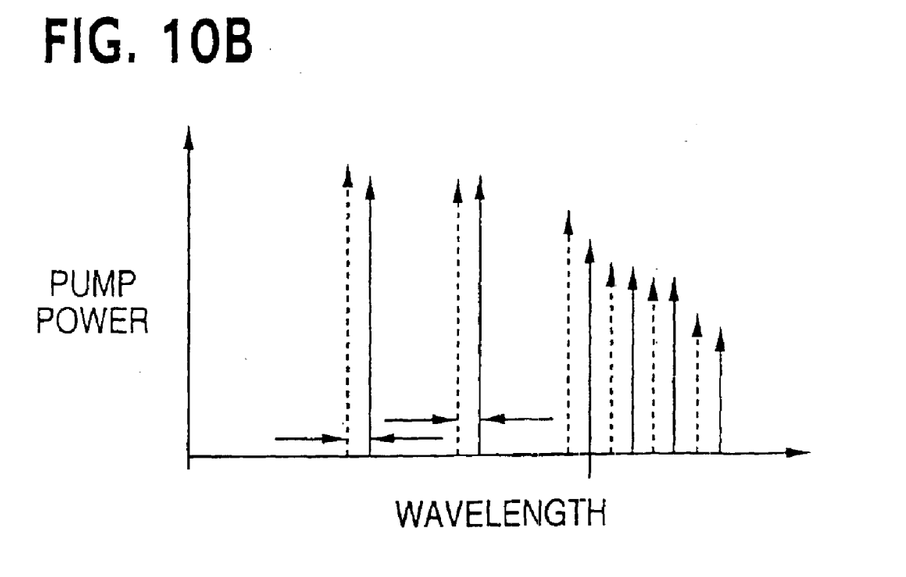

An example of a pump wavelength-pump power scheme for an amplifier according to an embodiment of the present invention with a 2×2 coupler is shown in FIGS. 10A and 10B. Specifically, FIG. 10A illustrates a coupled radiation profile of a first set of pump wavelengths output from a first pump radiation combiner, while FIG. 10B illustrates a coupled radiation profile of a second set of pump wavelengths output from a second pump radiation combiner. The exemplary pump wavelength-pump power scheme for both of the first and second sets includes six wavelengths each. In FIG. 10B the pump powers of the second set of pump wavelengths is shown by the solid lines. FIG. 10B also shows the pump powers of the first set of pump wavelengths by dashed lines. The relatively small difference in wavelength between corresponding wavelengths of the first and second sets provides for improved redundancy. In this regard corresponding wavelengths of the first and second sets of wavelengths are "adjacent" to one another. Adjacent wavelengths are wavelengths that are separated by 20 nm or less, and preferably by 10 nm or less. If the power for one of the wavelengths of one of the sets fails, there remains a corresponding wavelength in the other set. Thus, the failure of one wavelength does not drastically affect the overall pump wavelength-pump power gain profile.

It is not necessary that all of the wavelengths have an adjacent wavelength or another wavelengths that is the same to provide at least some redundancy. While all of the wavelengths may have an adjacent wavelength or another wavelengths that is the same, it may also be desired that only most or just some of the wavelengths have an adjacent wavelength or another wavelength that is the same.

In some applications redundancy may not be required or desired. In this case, none of the wavelengths may have an adjacent wavelength or another wavelength that is the same.

In general, once a pump wavelength scheme is chosen for an amplifier, the pump powers of the pump wavelengths can be set. The pump wavelengths are set so that the optical gain profile of the amplifier is the desired gain profile, such as a substantially flat gain profile.

The number of pump wavelengths for each of the first and second sets need not be the same. For example, one of the first and second sets may have five pump wavelengths, while the other of the first and second sets may have seven pump wavelengths. Further the total number of pump wavelengths in the first and second sets need not add up to twelve in order to produce a substantially flat gain profile. For example, one of the first and second sets may have seven wavelengths and the other of the first and second sets may have six wavelengths. Increasing the number of pump wavelengths has the advantage of increasing the flatness of the gain profile for a given wavelength range.

The flatness of a gain profile may be defined in terms of the gain ripple of the gain profile. If a flat gain profile is desired, the gain ripple of the overall combined pump radiation gain profile should be less than the gain ripple of the coupled radiation profiles of individual sets of wavelengths. Thus, the pump wavelength-pump power scheme of the preferred embodiments of the present invention may be such that the gain ripple of the gain profile of the overall combined pump radiation gain profile will typically be less than the gain ripple of the coupled radiation profiles of individual sets of wavelengths.

The total number of pump wavelengths provided by the pump assembly will depend upon the specific application and factors such as the gain profile flatness and redundancy desired and the wavelength range of the optical signals to be amplified. Although FIGS. 10A and 10B illustrate a total of twelve wavelengths, the total number of wavelengths may be eighteen, twenty, twenty-four, or even more.

Figure 11:
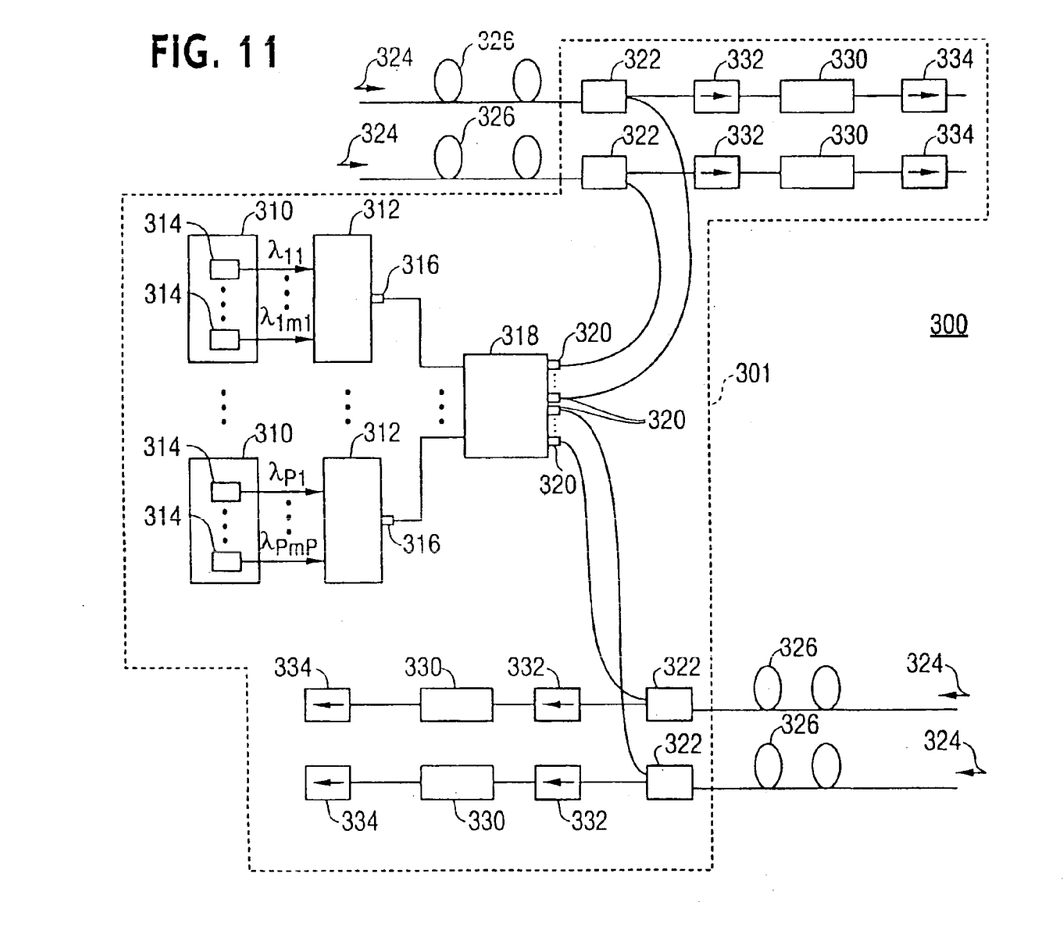
FIG. 11 is a schematic of an amplifier including a pump assembly containing a coupler according to another preferred embodiment of the invention.

FIG. 11 is a schematic of an optical amplifier 300 according to another embodiment of the invention. The amplifier 300 includes optical pump assembly 301 (shown enclosed by dashed lines) and transmission fiber 326. This embodiment differs from the embodiment of FIG. 7 in that the pump assembly 301 does not include a P×P coupler. Instead the pump assembly 301 includes a P×V coupler 318. A P×V coupler has P inputs and V outputs. Thus, this pump assembly can couple to and amplify up to V fiber transmission paths. The pump assembly 301 includes a number P of pump radiation sources 310 optically coupled to respective pump radiation combiners 312. In this embodiment the number of pump radiation combiners is also P. The optical amplifier 300 may be used as the amplifier 40 in the system of FIG. 6.

Returning to FIG. 11, each of the pump radiation sources 310 produces radiation having a set of wavelengths $\lambda_{i1}$ to $\lambda_{imi}$, where i designates the ith pump radiation source, and mi is the number of wavelengths generated by the ith pump radiation source. For example, the first pump radiation source generates a set of wavelengths $\lambda_{11}$ to $\lambda_{1m1}$, while the Pth pump radiation source generates a set of wavelengths $\lambda_{P1}$ to $\lambda_{PmP}$.

The pump radiation sources 310 may each comprise a number of individual radiation sources 314. These individual radiation sources 314 may be lasers or light emitting diodes, for example. The lasers may be fiber lasers, fiber coupled microchip lasers, or semiconductor lasers, for example.

Each of the pump radiation sources 310 produces radiation having a set of pump wavelengths and pump powers corresponding to the pump wavelengths. The sets of pump wavelengths and pump powers are generally different from one another.

The individual radiation sources 314 of a particular pump radiation source 310 emit radiation at the respective wavelengths of the set of wavelengths of that particular pump radiation source. For example, for the ith pump radiation source providing radiation at wavelengths $\lambda_{i1}$ to $\lambda_{imi}$, the individual radiation sources 314 of the ith pump radiation source respectively emit radiation at wavelengths $\lambda_{i1}$ to $\lambda_{imi}$.

Alternatively, any or all of the pump radiation sources 310 may comprise a single radiation source that simultaneously emits radiation at the wavelengths of the set of wavelengths of the pump radiation source. For example, the ith pump radiation source may comprise a single radiation source that simultaneously emits radiation at wavelengths $\lambda_{i1}$ to $\lambda_{imi}$. In this regard the pump radiation source may be a lamp.

Each pump radiation combiner 312 couples or combines the radiation at the wavelengths of the set of wavelengths for a respective pump radiation source 310. For example, the ith pump radiation combiner couples the radiation from the ith pump radiation source.

The coupled radiation provided by a combiner 312 is output at a pump radiation combiner output 316 of the combiner. There are P pump radiation combiner outputs 316, one for each of the P pump radiation combiners 312. The coupled radiation at each output 316 will have its own coupled radiation profile, which will be a combination of the radiation profiles of the radiation input into the combiner 312.

The P pump radiation combiner outputs 316 are optically coupled to a P×V coupler 318 with P inputs and V outputs. The number P is a positive integer greater than 1. V may be greater than, equal to, or less than P. The coupler 318 receives the coupled radiation from the P combiners 312 via the pump radiation combiner outputs 316. The coupler 318 outputs pump signals via V coupler outputs 320. Each of the pump signals has a respective pump radiation profile. Because the coupler 318 combines the coupled radiation profiles input into the coupler 318, the output from each of the V coupler outputs 320 has the spectral shape of the combined coupled radiation profiles. Thus, the spectral shape of each of the V pump radiation profiles is the same, and that spectral shape is the shape of the combination of the P coupled radiation profiles. Therefore, each of the V pump radiation profiles has a contribution from all of the individual wavelengths of the P pump radiation sources.

Of course the power of the individual pump radiation profiles will be less than the power of the combination of the coupled radiation profiles, because the coupler 318 splits the total power among the V coupler outputs 320.

In many application it will be desirable to have the same power for each of the V pump radiation profiles. However, in some applications, it may be desired to have a different power for at least some of the V pump radiation profiles.

Respective pump radiation profiles are output from respective coupler outputs 320 to respective of V pump-signal combiners 322. Each of the pump-signal combiners 322 optically couples an optical signal with a respective pump radiation profile. Specifically, an optical signal 324 propagates along a respective fiber 326 to a respective pump-signal combiner 322 where it is combined with a respective pump radiation profile. There are V optical signals 324 and V fibers 326 optically connected to the pump assembly 301 of this embodiment. The pump radiation profile radiation counterpropagates with respect to a respective optical signal 324 and amplifies the signal 324 in the fiber 326.

The preferred embodiments have been set forth herein for the purpose of illustration. However, this description should not be deemed to be a limitation on the scope of the invention. Accordingly, various modifications, adaptations, and alternatives may occur to one skilled in the art without departing from the scope of the claimed inventive concept.

What is claimed is:

1. A method of amplifying optical signals comprising:

providing a plurality of input radiation signals into the inputs of a P×V coupler, each of the input radiation signals having a respective input radiation profile having a set of pump wavelengths and pump powers corresponding to the respective wavelengths, wherein at least one set is different from at least one other set;

providing V output pump radiation profiles from the outputs of the P×V coupler; and amplifying an optical data signal by coupling at least one of the V output pump radiation profiles with the optical data signal, wherein at least one of the V output radiation profiles has a different power than at least one other of the V output pump radiation profiles.

2. The method of claim 1, wherein some of the wavelengths of the sets of wavelengths are the same or adjacent to other wavelengths of the sets of wavelengths.

3. The method of claim 1, wherein most of the wavelengths of the sets of wavelengths are the same or adjacent to other wavelengths of the sets of wavelengths.

4. The method of claim 1, wherein all of the wavelengths of the sets of wavelengths are the same or adjacent to other wavelengths of the sets of wavelengths.

5. The method of claim 1, wherein the providing a plurality of input radiation signals comprises:

combining the radiation from a plurality of pump radiation sources to provide coupled radiation profiles as the input radiation signals.

6. The method of claim 1, wherein the providing a plurality of input radiation signals comprises:

coupling the input radiation profiles to provide a combination of the input radiation profiles as the output pump radiation profiles.

7. The method of claim 1, wherein the output pump radiation profiles each provide a desired amplification gain profile over a first range of optical signal wavelengths.

8. The method of claim 7, wherein the first range of optical signal wavelengths has a range width of between 20 and 120 nm.

9. The method of claim 1, wherein the optical data signal is amplified via stimulated Raman scattering amplification.

10. The method of claim 1, wherein $P=2^Q$, where Q is a positive integer.

11. The method of claim 10, wherein P is 2.

12. The method of claim 10, wherein P is 4.

13. The method of claim 10, wherein P is 8.

14. The method of claim 1, wherein the plurality of input radiation signals comprises N input radiation signals.

15. The method of claim 14, wherein N=P.

16. The method of claim 1, wherein P≠V.

* * * * *